United States Patent
Mohajer et al.

(10) Patent No.: US 10,896,671 B1
(45) Date of Patent: Jan. 19, 2021

(54) USER-DEFINED EXTENSIONS OF THE COMMAND INPUT RECOGNIZED BY A VIRTUAL ASSISTANT

(71) Applicant: SoundHound, Inc., Santa Clara, CA (US)

(72) Inventors: Keyvan Mohajer, Los Gatos, CA (US); Christopher S. Wilson, Sunnyvale, CA (US); Bernard Mont-Reynaud, Sunnyvale, CA (US); Robert MacRae, Mountain View, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

(21) Appl. No.: 16/206,963

(22) Filed: Nov. 30, 2018

Related U.S. Application Data

(63) Continuation of application No. 15/169,709, filed on May 31, 2016, now abandoned.

(Continued)

(51) Int. Cl.

| | |
|---|---|
| *G06F 17/27* | (2006.01) |
| *G10L 15/07* | (2013.01) |
| *G10L 15/22* | (2006.01) |
| *G10L 15/18* | (2013.01) |
| *G10L 15/30* | (2013.01) |
| *H04L 12/28* | (2006.01) |

(Continued)

(52) U.S. Cl.
CPC ........ *G10L 15/075* (2013.01); *G10L 15/1822* (2013.01); *G10L 15/22* (2013.01); *G10L 15/222* (2013.01); *G10L 15/30* (2013.01); *H04L 12/2821* (2013.01); *G10L 17/22* (2013.01); *G10L 2015/223* (2013.01); *H04L 12/2803* (2013.01); *H04L 67/30* (2013.01)

(58) Field of Classification Search
None
See application file for complete search history.

(56) References Cited

U.S. PATENT DOCUMENTS

| | | | |
|---|---|---|---|
| 4,520,576 A | 6/1985 | Vander Molen | |
| 5,895,448 A | 4/1999 | Vysotsky et al. | |

(Continued)

OTHER PUBLICATIONS

"QUORA: Is there any speech recognition API to quickly and easily send voice command triggers into IFTTT?" Sep. 6, 2014, 1 page, [Online] [Retrieved on Oct. 12, 2017] Retrieved from the Internet<https://www.quora.com/Is-there-anyspeech-recognition-API-to-quickly-and-easily-send-voice-command-triggers-into-IFTIT>.

(Continued)

*Primary Examiner* — Richard Z Zhu
(74) *Attorney, Agent, or Firm* — Fenwick & West LLP

(57) ABSTRACT

A command-processing server provides natural language services to applications. More specifically, the command-processing server receives natural language inputs from users for use in applications such as virtual assistants. Some user inputs create user-defined rules that consist of trigger conditions and of corresponding actions that are executed when the triggers fire. The command-processing server stores the rules received from a user in association with the specific user. The command-processing server also identifies rules that can be generalized across users and promoted into generic rules applicable to many or all users. The generic rules may or may not have an associated context constraining their application.

19 Claims, 5 Drawing Sheets

Related U.S. Application Data

(60) Provisional application No. 62/207,923, filed on Aug. 21, 2015.

(51) Int. Cl.
*H04L 29/08* (2006.01)
*G10L 17/22* (2013.01)

(56) References Cited

U.S. PATENT DOCUMENTS

| | | | |
|---|---|---|---|
| 6,253,184 B1 | 6/2001 | Ruppert | |
| 7,299,187 B2* | 11/2007 | Tahara | G10L 15/10 704/239 |
| 8,150,699 B2 | 4/2012 | Patch | |
| 8,234,120 B2* | 7/2012 | Agapi | G10L 15/075 381/2 |
| 8,538,757 B2 | 9/2013 | Patch | |
| 9,286,892 B2* | 3/2016 | Mengibar | G10L 15/18 |
| 2002/0099730 A1 | 7/2002 | Brown et al. | |
| 2003/0167167 A1* | 9/2003 | Gong | G10L 15/22 704/250 |
| 2004/0006474 A1 | 1/2004 | Gong et al. | |
| 2004/0260562 A1* | 12/2004 | Kujirai | G01C 21/3608 704/275 |
| 2007/0011154 A1 | 1/2007 | Musgrove et al. | |
| 2007/0198267 A1 | 8/2007 | Jones et al. | |
| 2007/0208555 A1* | 9/2007 | Blass | 704/9 |
| 2008/0300886 A1 | 12/2008 | Patch | |
| 2014/0172953 A1* | 6/2014 | Blanksteen | H04L 67/22 709/203 |
| 2015/0162006 A1 | 6/2015 | Kummer | |
| 2015/0324706 A1* | 11/2015 | Warren | G06N 20/00 700/275 |

OTHER PUBLICATIONS

"What is IFTTT?" undated, 1 page, [Online] [Retrieved on Oct. 12, 2017] Retrieved from the Internet<URL:https://ifttt.com>.

Poirier, W., "Voice Control Using Siri and IFTTT (not using HomeKit, just voice text)," Jan. 2015, 4 pages, [Online] [Retrieved on Oct. 12, 2017] Retrieved from the Internet<https://community.smarththings.com/t/voice-control-using-siri-andifttt/8940>.

United States Office Action, U.S. Appl. No. 15/169,709, dated Aug. 10, 2017, nineteen pages.

* cited by examiner

USER-DEFINED EXTENSIONS OF THE COMMAND INPUT RECOGNIZED BY A VIRTUAL ASSISTANT

CROSS REFERENCE TO RELATED APPLICATION

The application is a continuation of U.S. patent application Ser. No. 15/169,709, filed on May 31, 2016, which claims the benefit of Provisional Application No. 62/207,923, filed on Aug. 21, 2015, both of which are hereby incorporated herein by reference.

TECHNICAL FIELD

The disclosed embodiments relate generally to computer-implemented methods for natural language-based command processing, and more specifically, to defining commands able to be interpreted as rules by applications such as virtual assistants and to automatically determine whether to expand the scope of use of those rules beyond the user who defined them.

Field of Classification: 704/1, 704/9, 717/106

BACKGROUND

Users of computer systems interact with applications such as virtual assistants for a variety of purposes, such as controlling their computer systems, issuing queries, and the like. However, conventional virtual assistants or other applications typically have a fixed vocabulary of commands types that they recognize, which limits the ability of users to flexibly interact with the virtual assistants. Further, the ways in which some users interact with their virtual assistants are often generalizable to use by other users, yet conventional virtual assistants lack the ability to identify such generalizable interactions and make them available to a wider set of users.

SUMMARY

A command-processing server (or equivalent functionality implemented on a client device) provides natural-language processing functionality to applications. In particular, the command-processing server enables users of a virtual assistant or other application to use natural language to create new behavior rules. The rules are remembered for the benefit of the user; they specify actions to be taken in response to specific natural language input. For example, after a user has issued the command "Whenever I say good morning, turn on the coffee machine", the command-processing server may respond by registering a new rule, that defines "good morning" as a new custom command that the system will recognize. Later, when the command-processing server receives the input "good morning" from the same user, it will execute code to turn on the digitally controlled coffee machine by sending appropriate instructions to the coffee machine.

In the rest of this disclosure, the terms "custom command" and "rule" are used interchangeably; for example, the custom command just defined has the name ("good morning") and the action ("turn on the coffee machine"); speaking the name triggers the action. Some rules also have a context component, that specifies constraints for the application of the rule.

The command-processing server further has the ability to identify particular rules that are likely to be globally applicable to many users—rather than solely to the specific users that defined those rules—and to make those rules available to many or all of the users of the command-processing server.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
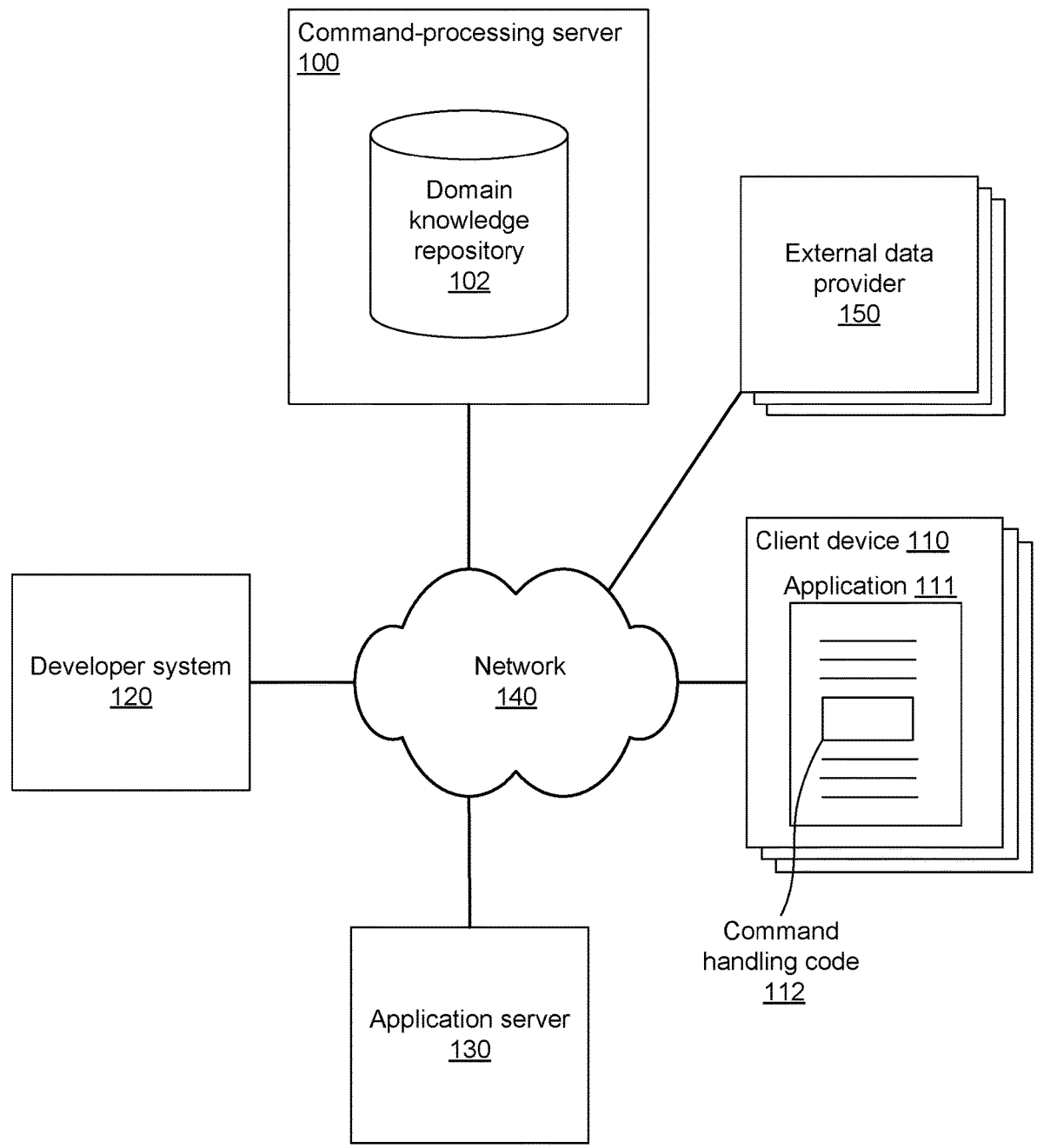
FIG. 1 shows a system environment in which command processing takes place, according to one embodiment.

FIG. 1 shows a system environment in which natural language command processing takes place, according to one embodiment. Users of the client devices 110 use the client devices to input natural language queries that express requests to applications 111. In this disclosure, the term "command" is a synonym for "query." The applications 111 execute partially or entirely on client devices 110; they are made up of executable computer code, and implement functionality for one or more application domains, such as calendaring and scheduling; event reminders; email, voice and other communications; mapping; music players, and the like, as well as virtual assistants that present a uniform interface to multiple domains. Applications 111 may include parsing and interpretation code (that may analyze a natural language command and, for example, interpret it as a request to create a calendar item) and execution code (that creates the calendar item). The parsing and interpretation may be done inline within the main application code, or via calls to another system, such as a command-processing server 100 that handles the details of the parsing/interpretation and/or execution delegated to it by the applications. The code of application 111 may be entirely located on client devices 110 (as illustrated in FIG. 1); it may be located on an application server 130; or some combination thereof, e.g., a thin client application on a client device 110 that makes calls to an application server 130. Likewise, the code of the application 111 that handles natural language processing can be partially or entirely executed on client devices 110. The embodiment described throughout the remainder of the specification primarily uses a command-processing server 100. One example of an application 111 is a "virtual assistant" application that responds to user commands in a wide range of possible domains.

In one embodiment, an application developer authors an application 111 on a developer system 120 and makes it available (e.g., via an app store, or download link) to the client devices 110, which install it locally. In this embodiment, the application developer, using domain knowledge for the application domain, additionally specifies a semantic grammar that defines a set of natural language expressions that it is able to interpret as valid commands to the application. Additional details of the semantic grammars of this embodiment are provided below with respect to FIG. 2.

In FIG. 1, client devices 110 execute software applications 111 developed by one or more developers on one or more developer systems 120 and then made available to users. An application 111 includes command-handling code 112 that receives commands from users in natural language form and delegates processing of the natural language commands to the command-processing server 100. (In some embodiments, some or all of the functionality of the command-processing server 100 is made available locally on the client device 110, e.g., by encapsulating the functionality as a code library that can be installed on client devices.) The command may be received by the command handling code 112 in different forms in different embodiments, such as written or spoken natural language, perhaps complemented by other means of input.

The system environment of FIG. 1 may include one or more external data providers 150 that make data available through API's; the data may drive the behavior of application 111. For example, an external data provider 150 may be a stock quote provider, providing the current prices of particular stocks, bonds, options, etc. Another example of a data provider is a weather provider that supplies data on current or predicted weather conditions in specified locations.

The command-processing server 100, client device 110, and developer system 120 are connected by a network 140. The network 140 may be any suitable communications network for data transmission. In one embodiment, the network 140 is the Internet and uses standard communications technologies and/or protocols.

Figure 2:
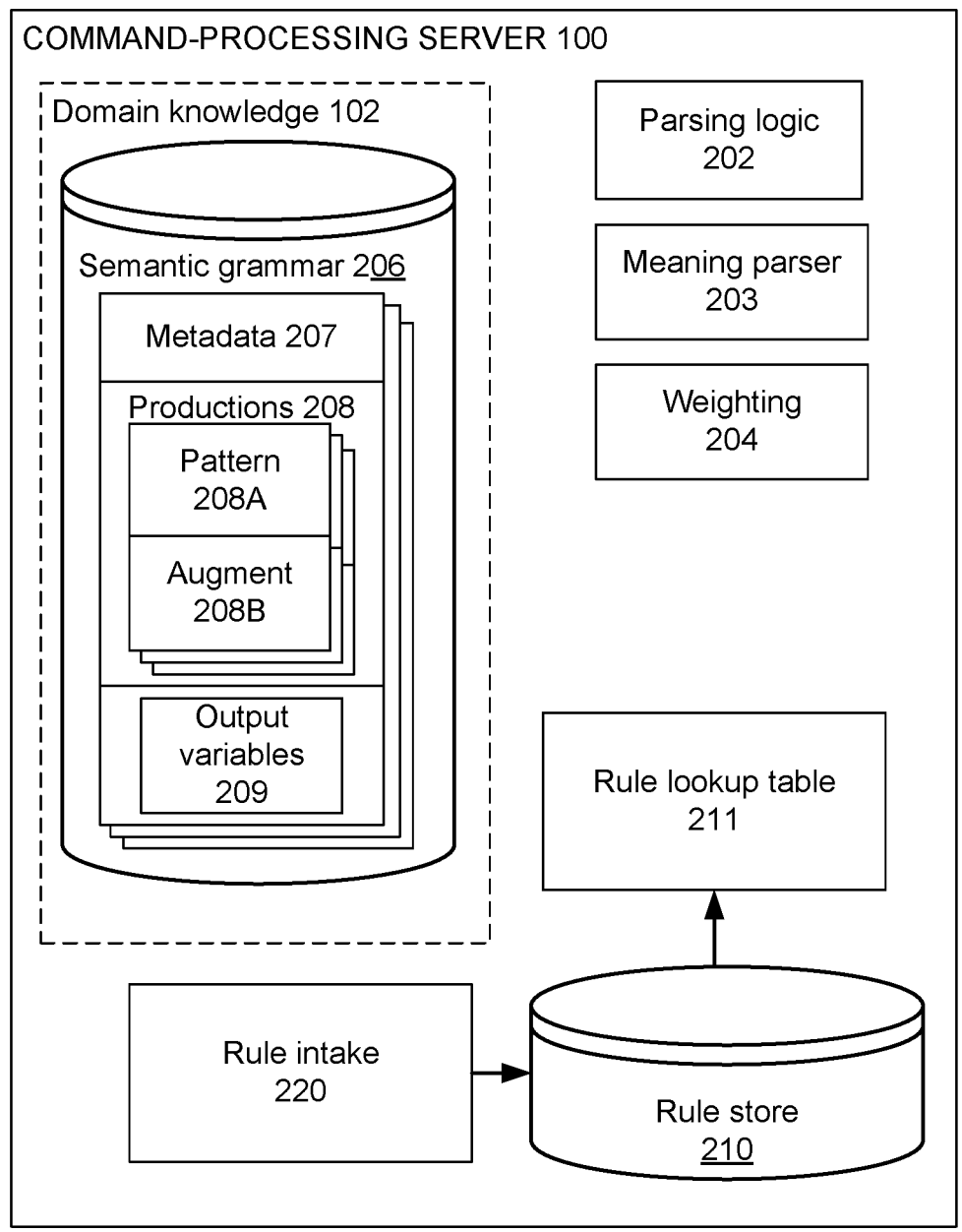
FIG. 2 illustrates in more detail the components of the command-processing server, according to one embodiment.

FIG. 2 illustrates in more detail the components of command-processing server 100 of FIG. 1, according to an embodiment. As can be appreciated by one of skill in the art, the configuration of the logic and data of the command-processing server 100 results in a particular, non-generic computer system that is specifically structured to perform the functions described herein. The command-processing server 100 stores domain knowledge data 102, which includes a set of semantic grammars 206. Every semantic grammar 206 defines a set of natural language expressions (hereinafter "expressions") that it is able to parse and interpret. Examples include possible ways to express natural language queries to ask for the creation or modification of calendar appointments, for setting up alarms, or for looking for restaurants. Semantic grammars and their corresponding expressions may also match specific parts of commands, such as a date, or a particular way to refer to a contact in one's address book. Semantic grammars 206 may be submitted by the developers of applications 111, and these developers may be part of an entity primarily responsible for the command-processing server 100; or they may be "third party" developers outside that entity. A semantic grammar 206 need not be specific to a particular domain, but rather may define a general expression applicable to many domains. Examples of such sub-domains include numeric quantities, prices, dates and times, and locations, to name a few. Sub-domain semantic grammars 206 of general interest can be conveniently accessed as part of a code library available to many applications 111.

A semantic grammar 206 has associated metadata 207, possibly including a name, a description, an author, and/or a date of submission. Each semantic grammar 206 also has output variables 209 whose values jointly represent the meaning (interpretation) of an expression recognized by the semantic grammar; these output variables may have default values. A semantic grammar 206 also has one or more productions 208. Each production 208 includes: a grammar pattern 208A that specifies the syntactic structure of natural language expressions that the semantic grammar 206 is able to recognize; and a (semantic) augment 208B, written in a formal notation (or using a programming language) that is suitably adapted for the semantic parsing task. The augment 208B is concerned with the interpretation of pattern 208A, and it is executed when the grammar pattern 208A has been matched in the input. An augment 208B specifies the value of some or all of the output variables 209; the value of an output variable left unspecified by the augment is obtained instead from the default value associated with the semantic grammar 206, or failing that, from a global default. In one embodiment, an augment 208B may be a program statement in a programming language; for example, it may be a begin . . . end block that consists of a sequence of statements in the programming language; some of the statements may be conditionals that test semantic constraints, and may cause the failure of the match, as further discussed below.

A semantic grammar 206 is said to recognize a natural language expression if the expression can be successfully parsed according to at least one production 208. This means that it matches the pattern 208A of one of the productions 208 of the semantic grammar 206, and that the semantic constraints (if any) enforced by the corresponding action 208B have been satisfied. The interpretation of the recognized expression is then defined by the collection of values of the output variables 209. If several productions 208 are able to match an expression, multiple parses are generated, each with their own interpretations; as parsing continues through the input, some of the parses may fail. For convenience in the present disclosure, we will assume (unless otherwise indicated) that a single parse is being produced, but the entire technique is applicable in the presence of multiple parses and interpretations.

If a natural language expression (or an entire command) can be successfully parsed and interpreted by a given semantic grammar 206, the interpretation yields an associated "meaning" defined by the values of the output variables 209 (if any), and an optional associated measure of strength, in embodiments that have a weighting module 204, as described below. The meaning of a request is an internal representation of the request, an interpretation suitable for execution. The internal representation is sent for execution to the command-processing server 100, which may do more processing before it sends a structured response back to the application 111. The application then displays parts of the structured response (e.g., by showing requested results), or acts upon the structured response (e.g., by making a phone call). If a natural language expression cannot be successfully interpreted by a semantic grammar, in one embodiment, the interpretation returns NULL or another special value signifying that the natural language expression could not be interpreted by the semantic grammar. In another embodiment, the failure of the semantic grammar to interpret the expression does not result in any return value, but instead results in a failure to complete parsing and interpretation.

In one embodiment, an expression pattern 208A corresponds to one of the ways of describing the right-hand side of a context-free grammar pattern, such as a (BNF) Backus-Naur Form or EBNF (Extended Backus-Naur Form) production rule. Alternative formalisms for the description of language offer alternative embodiments of the rule definitions in this disclosure. An expression pattern 208A may refer to other semantic grammars, allowing for hierarchical relationships between semantic grammars, including recursion. Alternative embodiments exist that do not rely entirely (or at all) on context-free grammars; they include part-of-speech analysis and the use of statistical patterns to associate natural language inputs with interpretations. In this disclosure, the term "semantic grammar" may refer to any of these alternative approaches to text understanding, although not all such approaches are entirely grammar-based.

The augments 208B may be used to assign values to the output variables 209 based on the natural language expression that the semantic grammar 206 interprets. In a typical embodiment, the output variables 209 (which are often the meanings of constituents) are built bottom-up, the meaning of an expression being derived from composing the meanings of its sub-expressions (or constituents). This approach is called bottom-up semantics; there are other approaches to constructing the meaning, also called interpretation, of an expression. In this disclosure, we make minimal assumptions about the nature of a parser-interpreter, although the example rules in this disclosure generally reflect the use of a context-free grammar.

In one embodiment, the programming language is a general-purpose procedural programming language that is extended with additional programming constructs for specifying natural language interpretation, such as the patterns 208A of the expressions to be matched. The use of a language extension is convenient to embed the semantic augments with parsing, but it is not a necessity. In one embodiment, semantic grammars 206 are defined by way of an extended procedural programming language (based on C++) in which "interpret blocks" define a grammar pattern 208A, while the block's "parameter list" declares the output variables 209, and standard C++ statements define the augments 208B that assign values to the output variables. It is appreciated that languages other than C++ could equally be used in other embodiments, and that techniques other than extending a programming language may be used, including techniques such as a dedicated parser driven by rules with left sides, right sides, and semantic augments.

In one embodiment a semantic grammar 206 is implemented by a 'code block' with the general form:
"block outputVariablesList blockName (pattern programmingAction)+"
where "outputVariablesList" is the output variables 209, "blockName" is the given name of the block that implements the semantic grammar 206, and each pair of a pattern expression 208A and a programmingAction 208B represents a particular action to be taken in response to the matching of a particular corresponding pattern. The expression (pattern programmingAction)+indicates that there are one or more pairings of a pattern with a programming action. A simple, concrete example of the use of this extended procedural programming language follows in Listing 1, below:

Listing 1
```
extern block (int totalPoints) TENNIS_POINTS( ) {
  interpret {
    (["what is"|0 "tell me"].["the"]."number of points
      played when announcer says".n1= VALID_TEN-
      NIS_NUMBER( ).["to"].n2=VALID_TENNIS_
      NUMBER( ))
  } as {
    totalPoints=(Points(n1→count)+Points
      (n2→count));
  }
}
static block (int count) VALID_TENNIS_NUMBER( ) {
  interpret {
    n_love=LOVE( )|n=INTEGER_COUNT( )
  } as {
    if (n_love) {count=0;}
    else {
      if ((n→count !=15) && (n→count !=30) &&
        (n→count !=40)) {excludethis( );}
        else {count=n→count;}
    }
  }
}
static block ( ) LOVE( ) {
  interpret {
    ("love"|"zero")
  } as { }
}
int Points(int score) {
  switch (score) {
  case 0: return 0; break;
  case 15: return 1; break;
  case 30: return 2; break;
  case 40: return 3; break;
  default: return -1;
  }
}
```

In the above example, the semantic grammar 206 named TENNIS_POINTS( ) is able to interpret an expression embodying a request to determine how many points have been played in a game based on the game score in a tennis match, with the meaning of the expression represented by output variables 209 in the parameter list (namely, the integer "totalPoints"). The expression pattern 208A (["what is"|0 "tell me"].["the"]."number of points
played when announcer says".n1=VALID_TENNIS_
NUMBER( ).["to"].n2=VALID_TENNIS_NUMBER
( ))

defines a set of possible expressions that a user may input (either in text or speech) to request the current number of points so far in a tennis game. The expressions optionally begin with either the phrase "what is" or "tell me", optionally followed by the word "the", followed by the phrase "number of points played when announcer says", followed by two numbers that are valid in tennis and that are optionally separated by the word "to". Note that by constructing a more flexible expression pattern 208A for expressions in the domain of interest—one that includes a greater range of alternative forms of expression—a developer can create a "broader spectrum" request interpretation system for users.

The numbers that are valid in tennis are in turn represented by their own semantic grammars 206 named "VALID_TENNIS_NUMBER" and which accepts the scores 15, 30, 40, or "love". The TENNIS_POINTS( ) semantic grammar can parse and interpret the expression "what is the score when announcer says fifteen love", and assign it a meaning represented by the value 1 for the totalPoints output variable. However, the expression "what is the score when announcer says fifteen eighty" cannot be parsed because "eighty" is not a VALID_TENNIS_NUMBER( ).

Note that the semantic grammar INTEGER_COUNT( ) is not defined in Listing 1, but (for example) is provided by a separate developer and submitted for inclusion in the domain knowledge data 102 for use by others, such as the author of the TENNIS_POINTS( ) semantic grammar of Listing 1.

Note also that the programming actions 208B may accomplish different types of purposes. For example, the programming actions 208B of the block TENNIS_POINTS( ) (i.e., the code "totalPoints=(Points (n1→count)+Points (n2→count));") simply converts the given two scores to point values and sums them, whereas the programming actions 208B of the VALID_TENNIS_NUMBER( ) block (i.e. the code beginning with "if (n_love) {count=0;}") specifies the semantic constraint that the score be "15", "30", or "40"; if this semantic constraint is not satisfied, the procedure excludethis( ) is called to abort the parse as unsuccessful.

The command-processing server 100 comprises parsing logic 202 that takes a natural language request as input and determines whether a given semantic grammar 206 can interpret that command, and if so (optionally) also computes a match strength measure between the given semantic grammar and the expression. A semantic grammar 206 is will assign a meaning or interpretation to a natural language expression if the expression can be parsed according to the semantic grammar's pattern 208A while satisfying the semantic grammar's semantic constraints (if any).

The parsing logic 202 has a meaning parser module 203 that accepts textual input for a natural language request and determines whether a given semantic grammar 206 can interpret that textual input.

In one embodiment, the parsing logic 202 also has a weighting module 204 that assigns values to successful interpretations of an expression as a way to rank the relative strength of the successful interpretations. Specifically, the weighting module 204 computes a match strength measure corresponding to a measure of strength of a parse obtained by a semantic grammar 206 parsing the given request, such as the estimated likelihood that the parse produces the request. The match strength measure is determined as a function of weights assigned to sub-expressions within the given expression that ultimately matches the input. In one embodiment, the weights of sub-expressions represent likelihoods of the sub-expressions, and the weight of the matching expression is calculated as the product of the weights of the sub-expressions. For instance, referring to the above code example of Listing 1, the expression pattern 208A for the TENNIS_POINTS( ) semantic grammar is composed of sub-expressions such as "what is", "tell me", "the", "number of points when announcer says", VALID_TENNIS_NUMBER( ) (a separate semantic grammar), and "to". In the optional disjunction ["what is"|10 "tell me"] the use of the weight 10 reflects an expectation that a user is 10 times more likely to say "tell me" than "what is" when expressing a request for a tennis score. Based on this, the weighting module 204 assigns a likelihood value of 1/(1+10)=1/11 to the alternative "what is", and likelihood 10/(1+10)=10/11 to the alternative "tell me". Accordingly, expressions that match the TENNIS_POINTS( ) semantic grammar 206 and begin with "tell me" will obtain higher match strength measures than those that match but begin with "what is".

Semantic Grammars for User-Defined Rules

Many semantic grammars 206 are domain-dependent. For example, the language used to book flights, and that involved in finding restaurants, are largely disjoint. However, they have commonalities. For example, they both employ a sublanguage of dates and times, and the semantic grammars that handle the expression of dates and times are relatively domain-independent. The semantic grammars 206 that recognize numbers, currencies and money amounts, geographical locations and the like also have general applicability across possible applications 111. Note that these shared sub-grammars all describe language constituents, which are known in linguistics to be "a word or a group of words that functions as a single unit within a hierarchical structure." It is a simple matter for constituent types to be reused across domains. Several types of semantic grammars 206 will now be described, which also have general applicability, but at the level of entire requests within applications 111, e.g., those applications serving as virtual assistants. These high-level semantic grammars, also known as "user-defined rules," may be of various possible forms.

Semantic Grammar for Custom Commands

In an embodiment, a specific semantic grammar 206 is used to specify an input format for the definition of a custom command. A custom command is a user-defined shorthand for one or more actions listed by the user. Custom commands are stored in order to cause future actions, conditional to being triggered by a user's input. In an embodiment, the grammar pattern 208A used to define custom commands may be expressed as:

"DEFINE( ) TRIGGER( ) ACTION_( )"

where DEFINE( ) recognizes various phrasings of the definition intent, such as "define", "if I say", or the like; TRIGGER( ) recognizes a literal string, called the "trigger string," consisting of a natural language word or phrase; and ACTION_( ) is a predefined semantic grammar used to recognize an action or sequence of actions, called the "triggered action." A person skilled in the art could define other forms for the syntax of custom command definitions. According to this type of definition, a rule's semantic interpretation takes the form of a (trigger, action) pair.

In an alternative embodiment, the system aims to develop rules that are sensitive to the context of their definition. Accordingly, a rule's interpretation may take the form of a triple (trigger, action, context), where the context tracks one or more constraints on context variables that are of interest to the system administrators. Example constraints are: (LOCATION="at home"); (ACTIVITY="driving"); ((ACTIVITY="walking") and (LOCATION="Safeway")) or (TIME_OF_DAY>="noon").

Context data may be obtained implicitly or explicitly. In an embodiment, implicit context data may be supplied by a client device along with a user query, and additional implicit context data may be derived from it. The context data may be (1) about the user, such as a user ID, from which other profile information (e.g., socio-economic data) may be derived by way of accessing persistent associations or databases; (2) about the current session, including notably the previous dialog; and (3) about the device's environment and global context, including local time, geolocation, audio noise environment, and an estimate of the most likely user activity from a combination of geolocation and motion sensing. Implicit context data such as listed above may be sent along with a user's query, or derived from information thus sent. Implicit context data is generally treated as relevant context for improved query processing. In an embodiment, specific parts of the implicit context data is included as part of the context variable in a (trigger, action, context) triple resulting from user-defined rule processing.

Context may also be explicit. In an embodiment, context is supplied explicitly by the user as part of a rule definition. In this situation, the semantic grammar used to define custom commands allows the presence of an explicit context. By making the explicit context optional in the definition of the rule, a user is allowed to express of both global rules and contextual rules. In the semantic grammar 206 below, an optional context precedes the rest of the definition, as follows:

"[EXPLICIT_CONTEXT( )] DEFINE( ) TRIGGER( ) ACTION_( )"

where the EXPLICIT_CONTEXT( ) semantic grammar may recognize location constraints, time constraints, or any other context constraints for which the system provides a semantic grammar.

Some embodiments support the use of both implicit context and explicit context. This implies a kind of merge of context information. This is straightforward for any parts of the context that are independent; for example, if the implicit context supplies a LOCATION value, and the explicit context has a TIME constraint, both constraints may be merged as part of a joint list of context constraints. However, implicit context usually supplies values for many properties, such as TIME, LOCATION, GENDER, AGE, . . . . In an embodiment of the context merge, a key principle to follow is that when explicit constraints are present, they override implicit constraints over the same property.

Clearly, the addition of an optional context trigger enlarges the set of possible rules. To simplify the presentation, it is convenient to call "trigger" the combination of the optional context trigger and the name trigger. The trigger is satisfied if (a) the context trigger is satisfied or absent, and (b) the user input matches the name trigger. This allows the replacement of a rule's name trigger by a more general trigger. Having done this, it is also easy to unpack the two components of a trigger (context trigger and name trigger) whenever needed. The semantic representation of a rule definition is thus a pair consisting of a trigger and a triggered action, and the trigger consists of a name trigger and optional context trigger. In many situations, the context trigger is absent.

Figure 4:
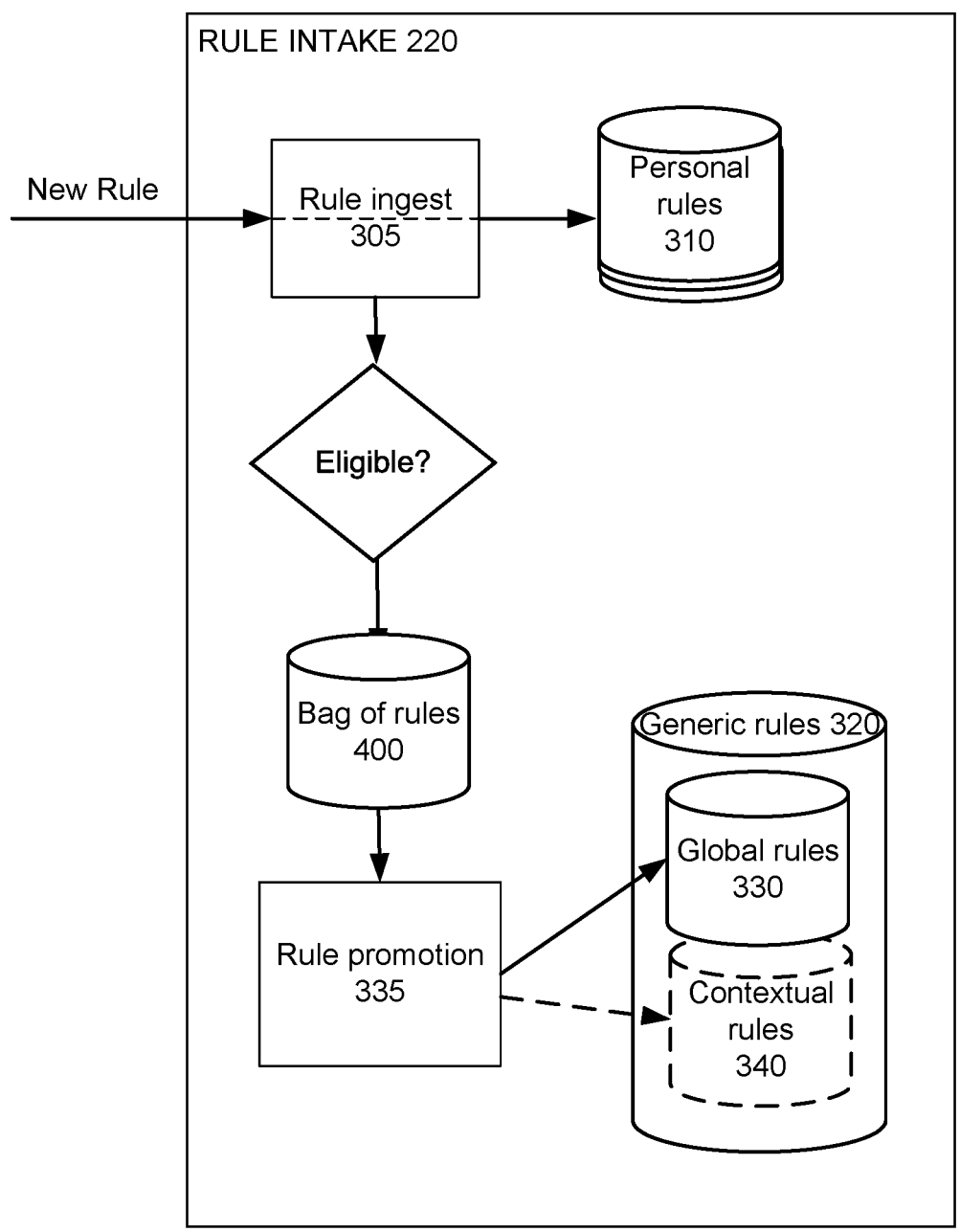
FIG. 4 illustrates in more detail the operation of the rule intake module, according to one embodiment.

The immediate effect of defining a custom command is to add the corresponding rule to the system; this is done by a rule intake module 220, illustrated in FIG. 2 and described by FIG. 4. The long-term effect of adding the rule is as follows: if a query from the same user satisfies the rule's trigger, the execution of ACTION_( ) will be triggered. In other words, the rule's action(s) will be executed when a user enters the custom command (the name trigger) and the context trigger (if any) is satisfied.

One example implementation of a custom command definition is provided in Listing 3 below, using the extended procedural programming language of Listing 1:

Listing 3
extern block ( ) DEFINE_CUSTOM_COMMAND( ) {
  interpret {
    ([context1=EXPLICIT_CONTEXT( )].("if I say-
      "."when I say").trigger1=TRIGGER( ).(["you"]|
      ["do"]).action1=ACTION_( ))))
  } as {
    Rule_Intake(trigger1, action1, context1);
  }
}

The DEFINE_CUSTOM_COMMAND( ) semantic grammar interprets the output from TRIGGER( ) as a string trigger1, the name trigger, which is the name of the custom command. As mentioned above, the effect of the custom command definition is that whenever the user's input literally matches the string value of trigger1, the application 111 will execute the action action1. In an embodiment, the output of ACTION_( ) action1, is an internal representation of the triggered action(s), in a form ready for execution. In an alternative embodiment, the triggered action action1 returned by ACTION_( ) takes the form of an unparsed string, intended to be parsed and interpreted later, in the context of the triggered execution; this amounts to "lazy" parsing.

In an embodiment, the effect of the call to Rule_Intake( ) is to add the pair (trigger1, action1) to a persistent data structure, called a rule store, and maintained by the application 111 (e.g., a virtual assistant) or by command-processing server 100. In some embodiments, rule generalizations are additionally handled, as will be discussed in detail with respect to FIG. 4.

For example, the DEFINE_CUSTOM_COMMAND( ) semantic grammar correctly recognizes a user command such as "When I say show me the big three tell me the price of Google, Apple and Facebook." This is because TRIGGER( ) matches the string "show me the big three" (which becomes the trigger string) and ACTION_( ) recognizes the expression "tell me the stock price of price of Google, Apple and Facebook" (whose interpretation will be the triggered action). Note that TRIGGER( ) equally matches a shorter string such as "show me the big," or a longer string such as "show me the big three tell." However, these partial matches do not lead to valid parses of the entire query, because the rest of the query ("three tell me the price of . . . " or "me the price of . . . ") is not recognized as valid by ACTION_( ).

The command-processing server 100 has a rule intake module 220, which stores the new rule for future use in a persistent data structure, the rule store 210. User queries are matched against the rule store 210 by rule lookup module 211. After the rule just defined has been added to rule store 210, if the same user enters "show me the big three," rule lookup 211 matches this name trigger in rule store 210 and retrieves the corresponding action. The interpretation of the custom command "show me the big three" is thus the same as that of "tell me the stock price of price of Google, Apple and Facebook." The latter interpretation is sent to the command-processing server 100 for execution. Details about rule intake 220 and rule lookup 211 will be given after additional requirements have been disclosed.

A particular case of the example of Listing 3 provides a textual output in response to a given input, as opposed to taking an arbitrary action. The textual output may be spoken using text-to-speech, displayed in a user interface, or both. In a more complex embodiment, the command-processing server 100 will send to the application 111 (e.g., on the client device 110) spoken, written, and visual responses, each of which may be either short or long, and the application 111 can decide which responses to use, based on the client device's capabilities, and optionally also on user preferences. When a client device 110 has sufficient display capabilities, such as a smartphone, a typical strategy would be to speak out the short spoken response, using text-to-speech, and to display the long written response. In the absence of a display on the user's device, the long spoken response may be spoken out. Other variations are possible, as well.

One example implementation in the extended procedural programming language of Listing 1 is as follows in Listing 4.

Listing 4
extern block( ) DEFINE_SAY_CUSTOM_COMMAND
  ( ) {
  interpret {

```
        ("if I say"."when I say").trigger1=TRIGGER
            ( ).["you"]."say".text1=TEXT( )))
    } as {
        Rule_Intake(trigger1, say_action(text1));
    }
}
```

Listing 4 is similar to Listing 3. An action of type "say" with textual input text1 as parameter has been substituted for the more general action, action1. The function say_action( ) is used here to cause text to be output in the desired format (e.g., text or speech). This is a special case of the DEFINE_CUSTOM_COMMAND( ) grammar ("if I say . . . you [do] . . . ") discussed earlier, so there is no need to elaborate further. Note that the DEFINE_SAY_CUSTOM_COMMAND( ) command format ("if I say . . . you say . . . ") is self-contained; it requires no other functionality in the system than the ability to extract the strings trigger1 and text1 from a user command, and to display or speak out a text result.

In response to a user query, command processing system 100 checks if the user's input string matches one of the name triggers in the rule store 210. This is done by rule lookup 211. The system attempts both to find a match for the input string in the rule store 210 and to use the parsing logic 202 in order to interpret the input string. In one embodiment, rule lookup 211 is implemented as just another semantic grammar, which appears in the grammar at the top level of the query grammar. For example, such code may be simply expressed as:

Listing 5
```
extern block (Action action) USE_CUSTOM_COMMAND( ) {
    interpret {
        rule=LOOKUP_TRIGGERS( );
    } as {
        action=rule.action;
    }
}
```

This code simply fails and exits if there is no match between the input query and one of the name triggers for the user input query. If a match is found, a matched rule is returned, and its action part (rule.action) is returned by the USE_CUSTOM_COMMAND( ) block. The next step taken by the command-processing server 100 is to execute the returned action.

In an alternative embodiment, instead of using a single query to define a custom command, according to the semantic grammar given above, the system may allow the user to specify a custom command interactively using a modal dialog with the virtual assistant. The following example modal dialog is quite verbose (shorter variations may be specified) but it has some advantages in simplicity relative to using a single very complex query:

User: "I want to add a new custom command"
Virtual Assistant: "What's your new command?"
User: "Good morning"
Virtual Assistant: "And what would you like me to say or do in response to that?"
User: "Show me the weather forecast for today"
Virtual Assistant: "OK, I can do that. Do you want me to do anything else after that?"
User: "Give me the stock price of CompanyX and CompanyY and CompanyZ"
Virtual Assistant: "OK, I will do that too. Anything else?"
User: "And tell me what meetings I have for today"
Virtual Assistant: "Will do. Anything else?"
User: "No"
Virtual Assistant: "OK. How long do you want me to remember to do that? You can say for the next 10 days, or you can say forever"
User: "Forever"
Virtual Assistant: "OK. I am saving that now. To delete, say 'Forget Good Morning'"

The first steps in this modal dialog have the command-processing server 100 create a custom command whose input trigger is the string "Good morning". Further steps define the effect of the custom command as a compound action whose first sub-action is an internal form of "Show me the weather forecast" and whose second sub-action is an internal form of "Give me the stock price of CompanyX and CompanyY and CompanyZ". Finally, the use of "Forever" omits setting a time limit for the applicability of the custom command.

The above dialog results in the creation of a new rule, whose trigger is the phrase "Good morning" and triggered actions are "Show me the weather forecast for today", "Give me the stock price of CompanyX and CompanyY and CompanyZ", and "Tell me what meetings I have for today." Just like a rule obtained from a single query, this new rule is stored in the rule store 210, and becomes available for use by the command-processing server 100.

Preparing for Expanding the Scope of Rules (Rule Generalization)

The disclosure above has addressed personal rules. By default, user-defined custom commands create rules whose effect is felt only by the individual user who defined them in the first place. In some embodiments, the scope of application of a rule can be broadened to a larger set of users. This will be called rule generalization. The rule format disclosed so far consists of (trigger, action-list) pairs; rules in this format are called global rules. In an embodiment, rules may specify a context; they consist of (trigger, action-list, context) triples; such rules are called contextual rules. The term generic rules encompasses global rules and contextual rules. Clearly, global rules may be also stored as (trigger, action-list, null_context) triples, where null_context is a special value that conveys the absence of an actual context specification.

Figure 3:
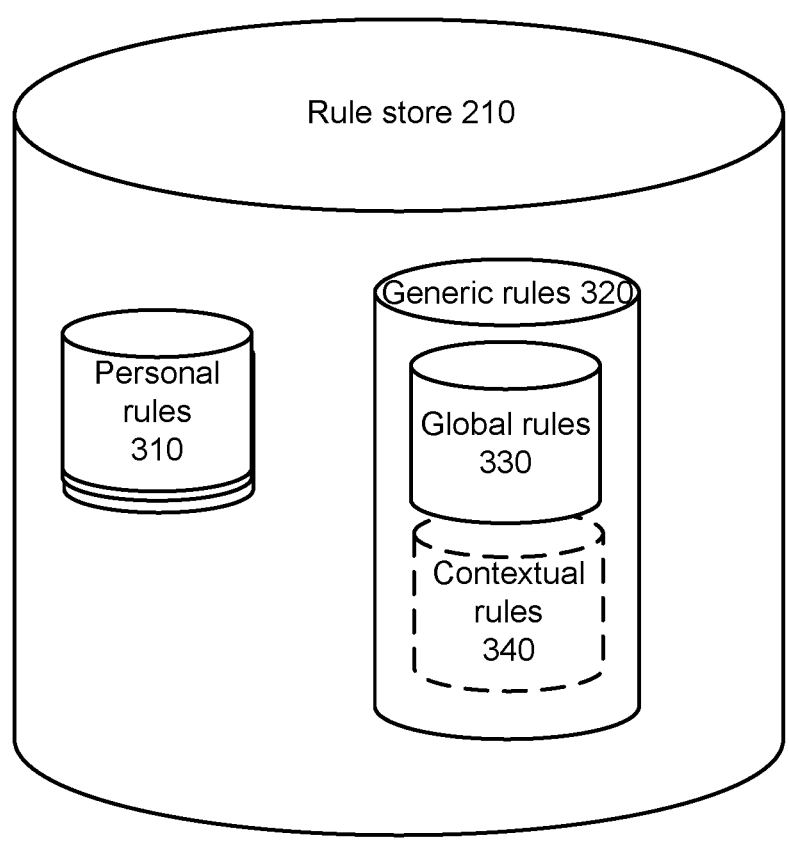
FIG. 3 illustrates the possible components of a persistent rule store, according to one embodiment.

FIG. 3 shows the structure of the persistent rule store 210 that supports the various kinds of rules in the system. A rule in the personal rules 310 is associated with a single user (the user who defined it) and its effect is experienced only by that user. Accordingly, the personal rules 310 data structure is partitioned on a per-user basis. In contrast, generic rules 320 consists of rules whose scope exceeds that of a single individual. It includes global rules 330, which are universally applicable, and contextual rules 340, which are applicable to all users and situations providing that certain context triggers are met. Rule lookup module 211 thus distinguishes among personal rules 310, global rules 330 and contextual rules 340. When looking up a name trigger, in one embodiment, a narrow scope rule (personal rule) is preferred to a generic one in the case that both a personal and a generic rule exist for the given name trigger. In another embodiment, when there are several matching options during the rule lookup, the user may be asked to make explicit choices, such as preferring the personal rule or forgetting the personal rule, and making this choice permanent or not.

Note that custom commands that are defined by one user can also be undefined by the same user. This may take the form of a command such as "forget string1" whose effect is to remove a personal rule from the same user if its trigger matches string1. In one embodiment, the command "globally forget string1" has the effect of removing all rules (personal or generic) whose name trigger matches string1. However, the use of such a command should be reserved to privileged users such as system administrators, since it is not wise to indiscriminately allow users to override the wisdom of the crowd.

The concrete implementation of the personal rules data structure 310 may use, for example, a hash map, or any other form of associative memory. The associative memory data structure (hash map or other) takes a user's unique ID as input, and returns a set of rules for the specific user; if a lookup is unsuccessful, it returns an empty set (or an equivalent indication of a lookup failure). In an embodiment, the user's set of rules is stored in an array of (trigger, action) pairs; each trigger is a string and each action is a NL interpretation data structure, in whatever form that takes in the command-processing server 100. In an embodiment, the set of name triggers may be alternatively represented by a "trie," a data structure known in the art, that providing for a compact storage and highly efficient search of the trigger set; if a match is found for a rule's trigger, a pointer to the rule's action set is stored in the trie. A reasonable alternative to a trie is, again, a hash map. In one implementation, generic rules 320 are stored in a single data structure that combines global rules 330 and contextual rules 340; this can be done simply by representing a rule in global rules 330 as a rule in contextual rules 340 with a NULL context trigger. In another implementation, separate data structures are used for global rules 330 and for contextual rules 340.

It is worth noting that certain rules are not generalizable, usually because they are inherently user-specific. These are, for example, rules whose triggers or whose actions depend on access to private user data. A first example, "If I say Madonna play my Madonna station on Pandora," is not generalizable to other users because a Pandora account and associated radio stations are user-specific. A second example, "When I say 'Call Grandpa' dial 555-123-4567," is not generalizable either because the nick-name Grandpa for "my grand-father" should be treated as user-specific, as are names for all family relationships, and other roles such as "my dentist," or "my tax accountant." At the least, the generalization of personal rules involving such terms, if permitted at all, should be treated with the utmost care. Certain other rules, however, are generalizable to a large class of users, and they will be called "eligible" for generalization. It is worthwhile to make them applicable to all users, or to an appropriate subset of users.

FIG. 4 illustrates the detailed operation of rule intake 220. The rule intake module is invoked to register a new rule, defined by its trigger and action list. The invocation also specifies whether the rule is eligible for generalization; the eligibility of a rule for generalization is decided on a case-by-case basis by the custom command definition semantic grammar 206, in a domain-dependent way, based on an examination of both the actions and trigger.

For example, if a user defines a custom command by uttering "Whenever I say 'Call Grandpa' dial 555-123-4567", parsing logic 202 recognizes the utterance as a custom command definition using a semantic grammar 206 (such as DEFINE_CUSTOM_COMMAND( )) to parse and interpret the user's rule. In this case, the new rule will be considered ineligible, as explained elsewhere, due to the infeasibility of generalizing a user-specific relationship. The execution of the user's query then proceeds to register the rule for future use, by entering the rule intake module 220—specifically handing the rule information over to the ingest module 305 as input. As a result, the rule is stored in personal rules 310, in association with the specific user. The data structure that stores personal rules 310 always associates with a rule the identity of the individual user who submitted the rule. The specific implementation of adding a new rule to Personal rules 310 varies with the specific data structure in use; various options have been discussed earlier. In one embodiment, a preliminary check is made to see if the specific name trigger was already defined as a custom command for this user. In one embodiment, the user receives a warning, and must confirm the new custom command definition before it overrides the former one. In another embodiment, the new action list simply replaces (overrides) the old one, and the prior check is unnecessary. In an embodiment, a check is also used to see if a new rule conflicts with a generic rule; if the name trigger is the same, and the actions are different, this check may be followed by asking the user for confirmation. In another embodiment, there is no such check: the same name trigger may appear both in personal rules 310 and generic rules 320. The rule lookup 211 module provides ways to handle the resulting ambiguity, for example, by giving preference to a narrow scope rule (a personal rule) over a generic one. Such a preference is a special case of a broader approach; certain more refined aspects of rule lookup 211 will be examined later, with additional context for their discussion.

Rule Generalization

In an embodiment, rule intake 220 also performs rule generalization where applicable. Besides storing a new rule in personal rules 310, rule ingest module 305 also collects the rules that are relevant to a generalization effort. It checks the eligibility of a new rule for generalization, and if the rule is eligible, it adds it to a bag of rules 400, a data structure that essentially collects in one place all the rules submitted by all users, as long as they are eligible for generalization. When the same rule is entered by multiple users, it exists only once in the bag, together with its number of occurrences across all users.

In one embodiment, the bag of rules 400 is maintained as a persistent data structure (as suggested in FIG. 4), but some care is taken to keep the bag of rules coordinated with the set of personal rules 310, i.e. to make sure that all rule additions and deletions are performed on both structures. In another embodiment, the system performs rule generalization only occasionally. In this embodiment, the bag of rules may be reconstructed from the union of personal rules 310 across all users; this requires that every rule's state of eligibility be stored in personal rules 310. This embodiment may be more efficient or less efficient that the previous embodiment, dependent on various trade-offs, and notably the update rate of the generic rules.

Based on collecting all eligible candidate rules for generalization, the bag of rules 400 may first accumulate histogram or statistics, such as the frequency counts of identical rules; the frequency counts of rules with a shared name trigger; the frequency counts of rules that share and entire trigger (name and context) but not the action parts of the rules. In some embodiments, building a bag of rules 400 may simultaneously build corresponding partitions of the set of rules, such as, say, partitions by a shared name trigger, or by a shared context trigger. All the data serve as preliminaries for rule generalization.

In some embodiments, the rule intake module 220 computes a generalization score that it associates with the rule, based on the rule's instances. A rule is "semantically identical" to another rule if the two rules contain equivalent triggers, and equivalent action components. The equivalence of triggers or actions may be recognized by the use of a general logic component, or by domain-specific heuristics, or any combination. For example, the rule "Whenever ACME stock is below $50 buy 50 shares twice" may not be considered identical to the rule "If ACME falls under $100 buy 100 shares" because the triggers are distinct, even if their actions are (arguably) equivalent.

A generalization score for a rule may be computed in different ways in different embodiments. For example, a constant weight (e.g., 1.0) may be added for every user that has submitted the rule at least once. In another embodiment, a variable weight may be added for each user that has contributed the rule, the weight being based on an attribute of the user, such as a computed "reputation score" of the user, or whether the user has been granted a privileged/trusted status by administrators of the command-processing server 100). If demographic characteristics are known about the user (such as race, age, gender, religion or profession, etc.) then separate generalization scores can be made for each demographic to select different rules for promotion.

In the next step, rule promotion module 335 processes the rules found in the bag of rules 400 in order to extract some generic rules. Adding a rule to global rules 330 (or contextual rules 340) is called "promoting" the rule to global status (or contextual status). Rule promotion module 335 operates differently in different embodiments; its operation is subject to numerous variations. For instance, it is possible to assign to every rule an initial generalization score based on its relative frequency of occurrence in the bag of rules 400. Stated simply, the more frequent a rule is (among generalizable user-defined rules), the greater is the motivation for promoting it. However, additional considerations and complexities come into play when implementing this idea. Many of them are discussed below.

In some embodiments, the promotion of rules may optionally be localized to a specific region, location or ethnicity, or restricted to a specific demographic group; this may be captured by context triggers. Accordingly, generic rules comprise, besides the aforementioned global rules 330, contextual rules 340 that may be indexed by location, times, geographic or demographic categories, or other context indicators that system administrators deem relevant.

The statistical analysis performed in the construction of the bag of rules 400 results in assigning initial (generalization) scores, which represent a ranking of candidate rules. In a first, less complex, embodiment, the operation of rule promotion module 335 may rely largely on manual selection. One or more designated users with special privileges (such as the administrators of command-processing server 100) can specifically select rules for promotion to global rules 330.

In a more complex variant of this embodiment, various automatic methods (such as described below) can isolate small numbers of "high quality" candidate generic rules; and a final manual review by system administrators may be used to select the generic rules that, based on their experience as administrators or trained specialists, are likely to be useful to many different users. Manually identified rules may be promoted and added to the global rules 330 or contextual rules 340 in much the same way as automatically identified rules.

In a broad sense, the techniques to be considered for rule generalization belong in the ML (machine learning) and pattern recognition contexts (machine learning at large), notably discrete or structural ML (in fields such as concept formation and rule induction) and NN-based machine learning. A small set of specific techniques is discussed here.

The generalization score for a rule can also be increased to the extent that the rule's specific expression contains "generalization language" that suggests that submitter of the rule thinks it as broadly applicable. For example, in some embodiments the generalization score for a rule is increased based on how often the rule's phrasing contains generalization language phrases such as "if they say", "if we say", "if someone says", or "if people say" (e.g., "if people say it's cold you raise the thermostat").

In some embodiments, after candidate rules are initially assigned generalization scores according to one of the methods described above, rule promotion module 335 may use additional steps to adjust generalization scores based on using structural similarities among the rules. This may be achieved with domain-independent techniques. In an embodiment, rules that share their trigger component (but have different action components) are processed as a group to modify their initial scores. For convenience, the notation "T→A" is introduced as a shorthand for a rule with trigger T and action A. Further, "A;B" is used as a shorthand for a sequence of two actions, A followed by B. For example, if the rule set contains 3 rules such as "T→A", "T→A;B" and "T→A;C" the existence of shared components between the three rules (i.e., their structural similarity) may cause them to reinforce each other, and can be used for re-scoring purposes. In an embodiment, the generalization scores of the rules "T→A;B" and "T→A;C" both may contribute to the final generalization score of rule "T→A" whose set of actions {A} is a subset of both {A,B} and {A,C}. Generalization score contributions may also be made in the reverse direction. For example, the rule "Whenever I say good morning, say good morning and start the coffee machine" can receive support from the rule "Whenever I say good morning, say good morning". In some embodiments, a rule such as "T→A" may contribute to the score of the rule "T→A;B". For example, the rule "Whenever I say good morning, say good morning" contributes to the score of the rule "Whenever I say good morning, say good morning and start the coffee machine". Generally stated, if two rules share their trigger, and the actions of one rule form a superset (or a subset) of the actions of another rule, each of the rules may receive support from the other rule. This means that the generalization score of one rule receives a positive contribution based on the generalization score of the other rule. The adjusted scores are computed from unadjusted in a re-scoring pass based on inter-rule structural relationships.

In one embodiment, positive contributions can be achieved simply by adding occurrence counts, which is a symmetric way of combining contributions. Asymmetrical ways to combine scores between supersets and subsets may also be devised. Asymmetrical weight factors may be used for subset and superset contributions. Alternatively, non-linear combinations may be used; in one embodiment, the L2 norm is used as follows. When rules R1, R2, . . . , RN whose scores are (x1, x2, . . . , xN) contribute to a rule R with score x0, the adjusted score x of rule R will be set according to $x^{}2=x0^{}2+x1^{}2+ \ldots +xN^{}2$—i.e., to the L2 norm of the vector (x0, x1, x2, xN). Note well that rule R contributes its original score x0 towards the adjusted score x, and that x>=x0.

The discussion above has positive contributions between rules of the form "T→A" and "T→A;B". However, negative contributions may also be relevant in other cases. Rules that exclude each other should reduce each other's generalization score; for example, two rules of the form "T→A;B" and "T→C" where B and C are mutually exclusive (such as, say, B=not C) should weaken each other. The rule "If the temperature is below 68 turn on the heater and open the vents" should decrease the generalization score of, and conversely have its score decreased by, the rule "If the temperature is below 68 turn off the heater". (Fortunately, the latter command is likely to receive a much lower frequency count and it will not be selected for generalization. Yet, it may detract from the previous rule.)

Domain-specific techniques for controlling rule generalization may be employed in other embodiments. For example, in some cases the "risk" of an action may be quantified. An action that has high risk presumably should not be generalized. We will discuss below how to determine whether, or to what extent, the risk of a rule "T→A" modifies the risk score of the rule "T→A;B". But first note that if, for example, action B is known to have low risk, the rule "T→A" supports the rule "T→A;B", since there is little risk to doing B in addition to doing A. For example, an action such as "say hello" might have a low quantified risk, since outputting the message "hello" is unlikely to have negative side effects. In contrast, the action "start the coffee machine" might have higher risk, since it has physical consequences (e.g., electricity use, coffee consumption, etc.).

In one embodiment, the domain-specific risk of an action is specified as part of the definition of its semantic grammar. For example, the code block defining the semantic grammar for the rule could have associated metadata "[risk=N]", where N is some number assigned by the author of the code block. The simplest implementation is to treat risk as a Boolean associated with certain actions that are seen as risky, and to block any generalization that would involve a risky action. This could be applied, e.g., to buying actions, or generally to actions that have side effects in the world that are not idempotent, or not compatible. In one embodiment, the risk of a compound action A;B is the result of combining the individual risks of A and B, using Boolean 'and' to combine Boolean risks or a suitable arithmetic formula to combine numeric risks (for example, if the risks a and x of A and B are between 0 and 1, the risk r of A;B could satisfy $(1-r)=(1-a)*(1-x)$, that is, $r=a+x+ax$. An action with a high risk value should have a lower generalization score, so the risk score can be seen as a kind of penalty to the generalization score.

In some embodiments, the rule promotion module 335 considers other factors when determining whether to store the rule in the global rules 330. In some embodiments, the rule promotion module 335 may cluster rules based on a location that is associated with the rule (e.g., geo-location from a mobile device, or a location corresponding to an IP address from which the rule was submitted to the command-processing server 100), only aggregating rule generalization scores based on other rules from the same location. This accounts for location-specific rules (e.g., those employing regionalisms, such as certain Cockney phrases within London) that may not be applicable to users in other locations. As another example, in some embodiments, the rule promotion module 335 clusters rules based on time of the rule submission, which (in a similar manner to location) accounts for rules that might be applicable primarily within a certain time span and later become outdated.

In these examples, the rules are stored together with indications of these additional factors (e.g., a particular location, time, or other contextual trigger associated with a rule), and below-discussed rule lookup module 211 considers these factors when determining whether to apply a given rule in the global rules 330. For example, if a particular rule in the global rules 330 were listed as being specific to London in the UK, then the rule lookup module 211 would not apply it for users located outside of London or, through the use of IP/GPS co-ordinates, in London, Ohio.

With the generalization scores for the rules computed, the rule promotion module 335 identifies rules with sufficiently high generalization scores and stores them within the global rules 330. (Thus, such rules are stored both within the personal rules 310 in association with the users that submitted them, and also within the global rules 330.) In one embodiment, the rule promotion module 335 computes a generalization score threshold that the individual rule generalization scores must meet or exceed in order to be considered sufficiently high for the corresponding rules to be stored in the global rules 330. In some embodiments the generalization score threshold is computed as a function of the number of rules that have been submitted to the rule ingest module 305, the number of distinct users of the command-processing server 100, or other. Excluding rules with low generalization scores from inclusion in the global rules 330 serves to greatly reduce the number of global rules, and this enhances the ability of the rule lookup module 211 (described below) to determine which of the global rules should apply in response to input by a user.

A more sophisticated global rules 330 will not just make a Boolean decision for each rule but instead store all the personal rules with various generalization scores for different regions and demographics—scores that are increased with each similar user rule. Each user's known geographical and demographic characteristics will then be used by the parsing logic 202 in determining which globally stored rules apply to that user. Adjusting the weights for specific regions or demographics may be achieved with machine learning classification techniques such as neural networks (NN) or support vector machines (SVN).

In the previous discussion of FIG. 2, it was mentioned that rule lookup module 211 may try to match the user's input in either personal rules 310 or generic rules 320. That is, the rule lookup module 211 causes the parsing logic 202 to attempt to interpret, for the given user, any of the rules specific to that user within the personal rules 310 (that is, the rules that the user has personally defined), or any of the applicable global rules in the global rules 330. (Certain global rules might not be considered "applicable" if they were made global contingent upon certain factors discussed above, such as location, and the current user does not satisfy that factor, such as not being located in the given location.)

In one embodiment, the rule lookup module 211 resolves "conflicts" between user-specific and global rules that both apply to a given user's input. A conflict is said to occur where the user input matches the trigger component of the rule, but the resulting action is not identical. For example, a conflict occurs if the personal rules 310 for a given user contains the rule "Whenever I say good morning, say good morning", and the global rule store 330 contains the rule "Whenever I say good morning, start the coffee machine". In one embodiment, the rule lookup module 211 resolves the conflict by taking the action of the user-specific rules store in the personal rules 310, instead of the action of the global rule in the global rules 330.

Example Computer Architecture

Figure 5:
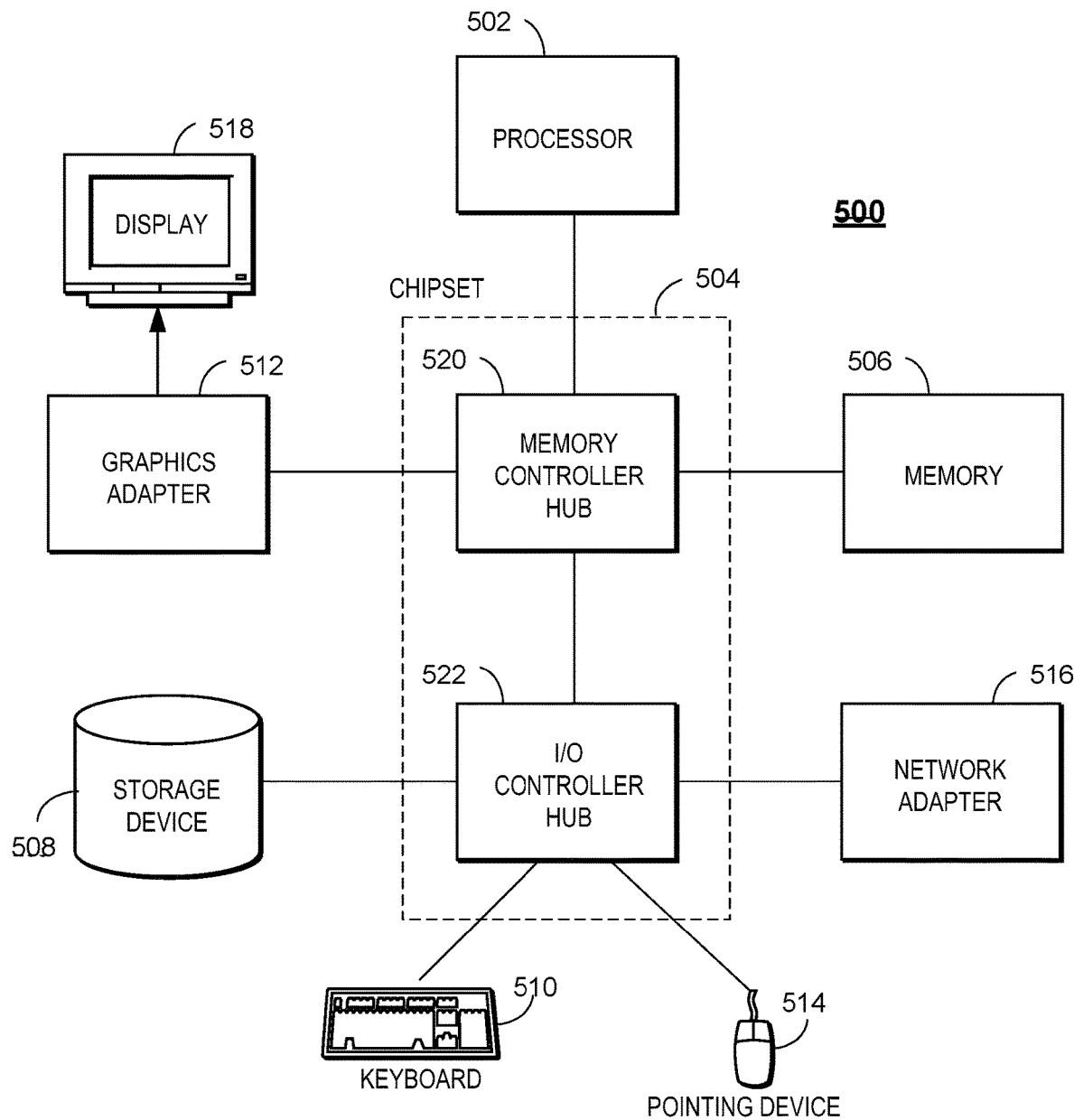
FIG. 5 is a high-level block diagram illustrating physical components of a computer used as part or all of the command-processing server, client device, or developer host from FIG. 1, according to one embodiment.

FIG. 5 is a high-level block diagram illustrating physical components of a computer 500 used as part or all of the command-processing server 100 or client device 110, developer system 120, application server 130, or external data provider 150 from FIG. 1, according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

OTHER CONSIDERATIONS

Reference in the specification to "one embodiment" or to "one embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which are set forth in the following claims.

What is claimed is:

1. A computer-implemented method for natural language processing in virtual assistants, the computer-implemented method comprising:
   receiving a first natural language input from a virtual assistant application on a client device of a first user;
   interpreting the first natural language input as defining a rule having a trigger and a corresponding action;
   storing the rule in a personal rules store;
   quantifying a measure of risk of executing the action;
   responsive to the measure of risk being below a threshold indicating low risk, identifying the rule as a generic rule so as to be available to users other than the first user;
   receiving a second natural language input from a virtual assistant application on a client device of a second user;
   determining that the second natural language input matches the rule's trigger;
   responsive to determining that the second language input matches the rule's trigger, executing the action.

2. The computer-implemented method of claim 1, wherein identifying the rule as a generic rule comprises:
   identifying other rules in the rules store that are semantically equivalent to the rule; and
   computing a generalization score for the rule using the identified other rules.

3. The computer-implemented method of claim 2, wherein computing a generalization score for the rule using the identified other rules comprises using user-specific weights corresponding to users that defined the identified other rules.

4. The computer-implemented method of claim 2, wherein computing a generalization score for the rule using the identified other rules comprises determining whether the trigger contains generalization language.

5. The computer-implemented method of claim 1, wherein identifying the rule as a generic rule comprises:
   computing a generalization score for the rule based on scores of rules sharing the trigger.

6. The computer-implemented method of claim 5, wherein the generalization score of the rule is derived based on scores of rules sharing the trigger and at least one action.

7. The computer-implemented method of claim 6, wherein a second rule sharing the trigger triggers a compound action comprising a first sub-action and a second sub-action, and wherein computing the generalization score for the rule further comprises quantifying a risk associated with the second sub-action.

8. The computer-implemented method of claim 1, wherein identifying the rule as a generic rule comprises:
   computing a generalization score for the rule;
   computing a generalization score threshold based on a number of rules in the rules store; and
   determining that the generalization score for the rule is at least as great as the generalization score threshold.

9. The computer-implemented method of claim 1, wherein the generic rule is a global rule.

10. A computer-implemented method comprising:
    receiving a first natural language input from a virtual assistant application on a client device of a first user;

interpreting the first natural language input as defining a rule having a trigger and a corresponding action;

storing the rule in a persistent rules store;

identifying the rule as a generic rule, based on a plurality of other natural language rules received from a plurality of users different from the first user;

storing the rule in a generic rules store;

receiving a second natural language input from a virtual assistant application on a client device of second first user;

determining that the second natural language input matches the rule's trigger; and responsive to determining that the second language input matches the rule's trigger, executing the action;

wherein identifying the rule as a generic rule comprises:
identifying other rules in the generic rules store that are semantically equivalent to the rule; and
computing a generalization score for the rule using the identified other rules.

11. The computer-implemented method of claim 10, wherein computing a generalization score for the rule using the identified other rules comprises using user-specific weights corresponding to users that defined the identified other rules.

12. The computer-implemented method of claim 10, wherein computing a generalization score for the rule using the identified other rules comprises determining whether the trigger contains generalization language.

13. A computer-implemented method comprising:
receiving a first natural language input from a virtual assistant application on a client device of a first user;
interpreting the first natural language input as defining a rule having a trigger, a context condition, and a corresponding action;
storing the rule in a persistent rules store;
identifying the rule as a generic rule, based on a plurality of other natural language rules received from a plurality of users different from the first user, the identifying comprising computing a generalization score for the rule based on scores of rules sharing the trigger;
storing the rule in a generic rules store;
receiving a second natural language input from a virtual assistant application on a client device;
determining that the second natural language input matches the rule's trigger;
determining whether the context condition is satisfied;
responsive to the context condition being satisfied, executing the action; and
responsive to the context condition not being satisfied, refraining from executing the action.

14. The computer-implemented method of claim 13, wherein the second natural language input is received from a second user different from the first user.

15. The computer-implemented method of claim 13, wherein identifying the rule as a generic rule additionally comprises:
identifying other rules in the rules store that are semantically equivalent to the rule; and
computing a generalization score for the rule using the identified other rules.

16. The computer-implemented method of claim 15, wherein computing a generalization score for the rule using the identified other rules comprises using user-specific weights corresponding to users that defined the identified other rules.

17. The computer-implemented method of claim 15, wherein computing a generalization score for the rule using the identified other rules comprises determining whether the trigger contains generalization language.

18. The computer-implemented method of claim 13, wherein the generalization score of the rule is derived based on scores of rules sharing the trigger and at least one action.

19. The computer-implemented method of claim 13, further comprising:
computing a degree of similarity of the rule to the plurality of other natural language rules received from the plurality of users different from the first user;
wherein identifying the rule as a generic rule is based at least in part on the computed degree of similarity; and
wherein rules in the generic rules store are available to users other than the first user.

* * * * *

UNITED STATES PATENT AND TRADEMARK OFFICE
CERTIFICATE OF CORRECTION

PATENT NO. : 10,896,671 B1
APPLICATION NO. : 16/206963
DATED : January 19, 2021
INVENTOR(S) : Mohajer et al.

Page 1 of 1

It is certified that error appears in the above-identified patent and that said Letters Patent is hereby corrected as shown below:

On the Title Page

Item (56), in Column 2, under "Other Publications", Line 6, delete "IFTIT>." and insert
-- IFTTT>. --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*